United States Patent
Maurer et al.

(10) Patent No.: US 10,000,387 B2
(45) Date of Patent: Jun. 19, 2018

(54) POST-TREATMENT OF A ZEOLITIC MATERIAL

(71) Applicant: BASF SE, Ludwigshafen (DE)

(72) Inventors: Stefan Maurer, Shanghai (CN); Faruk Oezkirim, Ludwigshafen (DE); Andrei-Nicolae Parvulescu, Ruppertsberg (DE); Jeff Yang, Glen Rock, NJ (US); Ulrich Mueller, Neustadt (DE)

(73) Assignee: BASF SE, Ludwigshafen (DE)

( * ) Notice: Subject to any disclaimer, the term of this patent is extended or adjusted under 35 U.S.C. 154(b) by 429 days.

(21) Appl. No.: 14/436,180

(22) PCT Filed: Oct. 9, 2013

(86) PCT No.: PCT/EP2013/071041
§ 371 (c)(1),
(2) Date: Apr. 16, 2015

(87) PCT Pub. No.: WO2014/060260
PCT Pub. Date: Apr. 24, 2014

(65) Prior Publication Data
US 2015/0284255 A1    Oct. 8, 2015

(30) Foreign Application Priority Data

Oct. 18, 2012 (EP) ................................... 12189040

(51) Int. Cl.
| | |
|---|---|
| *C01B 39/02* | (2006.01) |
| *B01J 29/70* | (2006.01) |
| *B01J 29/40* | (2006.01) |
| *C01B 39/36* | (2006.01) |
| *B01J 35/10* | (2006.01) |
| *C01B 39/46* | (2006.01) |

(52) U.S. Cl.
CPC ............. *C01B 39/026* (2013.01); *B01J 29/40* (2013.01); *B01J 29/70* (2013.01); *B01J 29/7007* (2013.01); *B01J 29/7015* (2013.01); *B01J 29/7038* (2013.01); *B01J 35/1014* (2013.01); *C01B 39/36* (2013.01); *C01B 39/46* (2013.01); *B01J 2229/38* (2013.01)

(58) Field of Classification Search
CPC ....... C01B 39/026; C01B 39/46; C01B 39/36; B01J 29/06; B01J 29/7007; B01J 2229/16; B01J 2229/37; B01J 2229/40; B01J 20/186; B01J 35/1014; B01J 29/40; B01J 29/7038; B01J 29/7015; B01J 29/70; B01J 2229/38
See application file for complete search history.

(56) References Cited

U.S. PATENT DOCUMENTS

| | | | |
|---|---|---|---|
| 5,443,812 | A | 8/1995 | Nakajima et al. |
| 5,508,019 | A | 4/1996 | Saxton et al. |
| 2004/0141911 | A1 | 7/2004 | Cooper et al. |
| 2012/0259141 | A1 | 10/2012 | Yilmaz et al. |

FOREIGN PATENT DOCUMENTS

| | | |
|---|---|---|
| CN | 102421740 A | 4/2012 |
| EP | 0 013 433 | 7/1980 |
| EP | 0 394 948 | 10/1990 |
| EP | 0 671 212 A1 | 9/1995 |
| EP | 0 690 024 | 1/1996 |
| JP | 3-131513 A | 6/1991 |
| RU | 2 099 284 C1 | 12/1997 |
| WO | 02 057181 | 7/2002 |
| WO | 2004 050548 | 6/2004 |
| WO | 2009 016153 | 2/2009 |
| WO | WO 2010/043843 A1 | 4/2010 |
| WO | WO 2010/130972 A2 | 11/2010 |
| WO | WO 2014/060259 A1 | 4/2014 |
| WO | WO 2014/060261 A1 | 4/2014 |

OTHER PUBLICATIONS

Zecchina, et al., "Sillicalite Characterization. 2. IR Spectroscopy of the Interaction of CO with Internal and External Hydroxyl Groups", The Journal of Physical Chemistry, vol. 96, No. 12, (1992), pp. 4991-4997.
International Search report dated Jan. 23, 2014 in PCT/EP13/071041 Filed Oct. 9, 2013.

*Primary Examiner* — David M Brunsman
(74) *Attorney, Agent, or Firm* — Oblon, McClelland, Maier & Neustadt, L.L.P.

(57) ABSTRACT

A process for the post-treatment of a zeolitic material, the process comprising (i) providing a zeolitic material, wherein the framework structure of the zeolitic material comprises $YO_2$ and $X_2O_3$, wherein Y is a tetravalent element and X is a trivalent element; (ii) subjecting the zeolitic material provided in (i) to a method comprising (a) treating the zeolitic material with an aqueous solution having a pH of at most 5, (b) treating the zeolitic material obtained from (a) with a liquid aqueous system having a pH in the range of 5.5 to 8 and a temperature of at least 75° C.; wherein in (ii) and after (b), the zeolitic material is optionally subjected to at least one further treatment according to (a) and/or at least one further treatment according to (b).

26 Claims, No Drawings

POST-TREATMENT OF A ZEOLITIC MATERIAL

This application is a National Stage of PCT/EP2013/071041, which was filed on Oct. 9, 2013. This application is based upon and claims the benefit of priority to European Application No. 12189040.4, which was filed on Oct. 18, 2012.

The present invention relates to a process for the post-treatment of a zeolitic material, wherein a zeolitic material having a framework structure comprising $YO_2$ and $X_2O_3$ is provided wherein Y is a tetravalent element and X is a trivalent element, and then subjected to a method comprising at least one treatment with an aqueous solution having a pH of at most 5 followed by at least one treatment with a liquid aqueous system having a pH in the range of 5.5 to 8 and a temperature of at least 75° C. Further, the present invention relates to a zeolitic material having a framework structure which comprises $YO_2$ and $X_2O_3$ which has a $YO_2:X_2O_3$ molar ratio of at least 20:1 and a crystallinity of at least 70%. Yet further, the present invention relates to the use of this zeolitic material and the zeolitic material which is obtainable or obtained by the process of the present invention as catalyst.

Zeolites have many applications in chemical industry, mostly in heterogeneous catalysis in various chemical and petrochemical processes. Generally, they are crystalline aluminosilicates having microporous structure. The special properties of the zeolites are attributed, among others, to their porous structure in the form of a pore system of molecular dimensions which is accessible for molecules depending on their shape and their size. There are numerous known zeolite framework structures which can serve as selective heterogeneous catalysts for several types of applications. The framework type and the chemical composition are responsible for the properties of the zeolite such as ionexchange capacity, porosity, accessibility, acidity and hydrophilic or hydrophobic properties.

In order to modify the properties of zeolitic materials such as their structure or their composition, post-treatment methods are often employed. Common post-treatment methods are steam treatment, acid treatment, or basic treatment.

Steam treatment is often used to enhance the activity and stability of the zeolite against water vapor for various selective reactions. EP 0 013 433 A1, for example, teaches the use of steam treatment to increase the activity of a zeolite by increasing the Si/Al ratio. This steam treatment not only influences the Si/Al ratio, but also has an impact on the acidic/basic properties and the hydrophilicity/hydrophobicity of the zeolite.

Acid treatment has a similar effect and also leads to dealumination of the zeolite. For such acid treatment, organic acids such as acetic acid, propionic acid, oxalic acid or mineral acids such as hydrochloric acid, nitric acid, sulfuric acid or phosphoric acid are often employed. Reference is made, for example, to WO 02/057181 A2 wherein an acid treatment is carried out in order to increase the hydrophobicity of a zeolitic material.

A combination of steam treatment and acid treatment is described in WO 2009/016153 A2. According to this document, phosphorus-modified molecular sieves having a low Si/Al ratio are subjected to a steam treatment at high temperatures before a leaching step with an acidic solution is carried out to remove Al from the zeolite framework structure.

Both the steam treatment and the acid treatment have a significant influence on the properties of the zeolitic material. By subjecting a zeolitic material comprising both tetravalent and trivalent structural components $YO_2$ and $X_2O_3$, respectively, to a steam and/or an acid treatment, the $YO_2:X_2O_3$ molar ratio is increased. However, it was found that the crystallinity of the zeolitic material is decreased by the steam treatment and/or the acid treatment, and that the hydrophobicity of the zeolitic material decreases. Therefore, it was found that the steam treatment and the acid treatment both result in a partial transformation of the zeolitic material into an amorphous material. Further, by changing the hydrophobicity, the originally intended use of the zeolitic material is often no longer possible. Therefore, although a desired $YO_2:X_2O_3$ molar ratio can be achieved by the steam treatment or the acid treatment, the obtained zeolitic materials have major disadvantages which, among others, make them uninteresting for commercial use.

Therefore, it was an object of the present invention to provide a process for the posttreatment of a zeolitic material which does not exhibit said disadvantages.

Further, it was an object of the present invention to provide a post-treated zeolitic material with a high $YO_2:X_2O_3$ molar ratio and simultaneously a high crystallinity. It was also an object of the present invention to provide a post-treated zeolitic material having a high $YO_2:X_2O_3$ molar ratio, a high cristallinity and at the same time a reduced concentration of internal defects such as silanol nests. In particular, it has been observed that the treatment of a zeolitic material for increasing the $YO_2:X_2O_3$ molar ratio such as by acid treatment leads to the increased formation of silanol nests which are for example characterized by an adsorbtion band in the IR spectrum of the zeolitic material located in the range of from 3600 $cm^{-1}$ to 3700 $cm^{-1}$. Within the meaning of the present invention, the term "silanol nests" preferably refers to hydrogen-bonded Si-OH groups of which the characteristic absorption in the IR spectra of e.g. silicalites is found in the range of 3200 to 3650 $cm^{-1}$, as described in Zecchina et al. in *J. Phys. Chem.* 1992, 96, pp. 4991-4997.

Surprisingly, it was found that a post-treatment process which involves subjecting a zeolitic material comprising $YO_2$ and $X_2O_3$ to at least one treatment with an aqueous solution having a pH of at most 5 and at least one treatment with a liquid aqueous system having a pH in the range of 5.5 to 8 at elevated temperatures of at least 75° C. avoids said disadvantages. In particular, it was further surprisingly found that although the X elements are partially removed from the zeolitic material during said post-treatment process, the resulting zeolitic material, however, exhibits an increased crystallinity and even a reduced concentration of internal defects.

Therefore, the present invention relates to a process for the post-treatment of a zeolitic material, the process comprising (i) providing a zeolitic material, wherein the framework structure of the zeolitic material comprises $YO_2$ and $X_2O_3$, wherein Y is a tetravalent element and X is a trivalent element;

(ii) subjecting the zeolitic material provided in (i) to a method comprising
  (a) treating the zeolitic material with an aqueous solution having a pH of at most 5;
  (b) treating the zeolitic material obtained from (a) with a liquid aqueous system having a pH in the range of 5.5 to 8 and a temperature of at least 75° C.;

wherein in (ii) and after (b), the zeolitic material is optionally subjected to at least one further treatment according to (a) and/or at least one further treatment according to (b), and wherein the pH of the aqueous solution according to (a) and the pH of the liquid aqueous system according to (b) is determined using a pH sensitive glass electrode.

Therefore, the process of the present invention can comprise two or more treatments according to (a) and/or two or more treatments according to (b). If the process comprises two or more treatments according to (a), the conditions in a given treatment (a) can be identical to or different from the conditions in another treatment (a). If the process comprises two or more treatments according to (b), the conditions in a given treatment (b) can be identical to or different from the conditions in another treatment (b).

According to the present invention, $YO_2$ and $X_2O_3$ comprised in the framework structure of the zeolitic materials provided in step (i) are contained in the framework structure as frameworking-forming elements, as opposed to non-framework elements which can be present in the pores and cavities formed by the framework structure and which can be typical for zeolitic materials in general.

As far as the chemical nature of Y and X is concerned, no specific restrictions exist. In particular, Y can be any conceivable tetravalent element or mixture of two or more tetravalent elements, and X can be any conceivable trivalent element or mixture of two or more trivalent elements. Preferred tetravalent elements according to the present invention include, but are not restricted to, Si, Sn, Ti, Zr, and Ge. Preferred trivalent elements according to the present invention include, but are not restricted to, Al, B, In, Ga and Fe. Preferably, Y is selected from the group consisting of Si, Sn, Ti, Zr, Ge and combinations of two or more thereof, Y preferably being Si, and X is selected from the group consisting of Al, B, In, Ga, Fe and combinations of two or more thereof, X preferably being Al.

Generally, according to the present invention, the framework structure of the zeolitic material provided in (i) comprises $YO_2$ and $X_2O_3$. Preferably, at least 95 weight-%, more preferably at least 98 weight-%, more preferably at least 99 weight-% framework structure of the zeolitic material provided in (i) consist of $YO_2$ and $X_2O_3$. Therefore, according to a preferred embodiment of the present invention, at least 95 weight-%, more preferably at least 98 weight-%, more preferably at least 99 weight-% of the framework structure of the zeolitic material provided in (i) consist of $SiO_2$ and $Al_2O_3$.

According to the present invention, the crystallinity of the zeolitic material provided in (i) is not subject to any specific restrictions. As far as the crystallinity is concerned, the values referred to in the context of the present invention are to be understood as being determined according to the method as described in Reference Example 2. By way of example, the crystallinity of the zeolitic material provided in (i) may be in the range of from 50% to 100% such as from 60% to 90% or from 70% to 80%.

According to the present invention, the water uptake of the zeolitic material provided in (i) is not subject to any specific restrictions. As far as the water uptake is concerned, the values referred to in the context of the present invention are to be understood as being determined according to the method as described in Reference Example 1. By way of example, the water uptake of the zeolitic material provided in (i) may be in the range of from 10 weight-% to 30 weight-% such as from 10 weight-% to 20 weight-% or from 10 weight-% to 15 weight-%.

According to the present invention, the IR spectrum of the zeolitic material provided in (i) may exhibit a first absorption band with a maximum in the range of from 3730 $cm^{-1}$ to 3750 $cm^{-1}$ and a second absorption band with a maximum in the range of from 3600 $cm^{-1}$ to 3700 $cm^{-1}$, wherein the ratio of the peak height of the second absorption band relative to the peak height of the first absorption band may greater than 1. As far as the IR spectrum is concerned, the values referred to in the context of the present invention are to be understood as being determined according to the method as described in Reference Example 3.

Step (ii)

According to the present invention, the zeolitic material provided in (i) is subjected to a method comprising (a) treating the zeolitic material with an aqueous solution having a pH of at most 5 and (b) treating the zeolitic material obtained from (a) with a liquid aqueous system having a pH in the range of 5.5 to 8, wherein the treatment is conducted at a temperature of at least 75° C.

Preferably, the thus obtained zeolitic material is subjected to a further treatment with an aqueous solution according to (a), wherein the first and the second treatment according to (a) can be conducted under identical or different conditions.

Preferably, the liquid aqueous system used in step (a) comprises at least 90 weight-%, preferably at least 95 weight-%, more preferably at least 98 weight-%, more preferably at least 99 weight-%, more preferably at least 99.9 weight-% water, most preferably deionized water.

Generally, the zeolitic material obtained from (b) can be subjected to at least one further treatment according to (a) and/or at least one further treatment according to (b). Therefore, after a first step (b), a further step (a) and/or a further step (b) can be carried out. Preferably, after a first step (b), a further step (a) is carried out. Therefore, the present invention also relates to a process as defined above, wherein the method according to (ii) comprises (a) treating the zeolitic material with an aqueous solution having a pH of at most 5,
(b) treating the zeolitic material obtained from (a) with a liquid aqueous system having a pH in the range of 5.5 to 8 and a temperature of at least 75° C.;
(a) treating the zeolitic material obtained from (b) with an aqueous solution having a pH of at most 5.

Optionally, after the second step (a), the zeolitic material is subjected to at least one further sequence of a treatment according to (b) followed by a treatment according to (a). Alternatively, after the second step (a), the process can be followed by a treatment according to (b), without a subsequent step (a). Preferably, steps (a) and (b) of the present invention are carried out in alternating sequence. By way of example, the preferred sequences according to the present invention include, but are not restricted to:

(a) (b) (a)
(a) (b) (a) (b)
(a) (b) (a) (b) (a)
(a) (b) (a) (b) (a) (b)
(a) (b) (a) (b) (a) (b) (a)
(a) (b) (a) (b) (a) (b) (a) (b)
(a) (b) (a) (b) (a) (b) (a) (b) (a)
(a) (b) (a) (b) (a) (b) (a) (b) (a) (b)

Therefore, the present invention also relates to a process as defined above, wherein the method according to (ii) comprises (a) treating the zeolitic material with an aqueous solution having a pH of at most 5;
(b) treating the zeolitic material obtained from (a) with a liquid aqueous system having a pH in the range of 5.5 to 8 and a temperature of at least 75° C.;
(a) treating the zeolitic material obtained from (b) with an aqueous solution having a pH of at most 5;

wherein the zeolitic material obtained from the last step (a) is optionally subjected to at least one further sequence of a treatment according to (b) followed by a treatment according to (a).

In general, there is no particular restriction regarding the number of steps (a) and (b) according to the present invention. Generally, it is conceivable that after a given step (a), at least one further step (a) is carried out. Further, it is conceivable that after a given step (a), at least one further step (b) is carried out.

Further, it is conceivable that, after at least one step (a) and/or at least one step (b), the zeolitic material is subjected to a treatment with a liquid aqueous system having a pH in the range of 5.5 to 8 and a temperature of less than 75° C., preferably of at most 50° C., more preferably of at most 40° C., more preferably in the range of from 15° C. to 35° C. Preferably, such a treatment step is carried out after at least one step (a).

After at least one step (a) and/or after at least one step (b) and/or after at least one step of treatment with a liquid aqueous system having a pH in the range of 5.5 to 8 and a temperature of less than 75° C., preferably of at most 50° C., more preferably of at most 40° C., more preferably in the range of from 15° C. to 35° C., the zeolitic material can be subjected to either drying or calcination or drying and calcination. Preferably, drying is carried out at a temperature in the range of from 75° C. to 200° C., preferably 100° C. to 180° C., more preferably from 120° C. to 150° C., for a period in the range of from 1 h to 100 h, preferably from 5 h to 80 h, more preferably from 10 h to 70 h, more preferably from 15 h to 25 h. Drying can be carried out under any suitable atmosphere such as in air, lean air, nitrogen, argon and the like, preferably air. Preferably, calcination is carried out at a temperature in the range of from 400° C. to 750° C., preferably from 550° C. to 700° C., more preferably from 600° C. to 680° C., for a period in the range of from 0.1 to 20 h, preferably from 0.5 h to 15 h, 1 h to 10 h, more preferably from 2 h to 5 h. Calcination can be carried out under any suitable atmosphere such as in air, lean air, nitrogen, argon and the like, preferably air. If two or more drying steps are carried out, these steps can be performed at identical or different conditions. If two or more calcination steps are carried out, these steps can be performed at identical or different conditions.

According to one embodiment of the present invention, a calcination is carried out after at least one step (a) and not carried out after at least one step (b). According to this embodiment, it is conceivable, for example, to carry out calcination after every step (a) whereas after none of steps (b) a calcination is carried out.

According to another embodiment of the present invention, calcination is carried out neither after at least one step (a) nor after at least one step (b). According to this embodiment, it is conceivable, for example, that after none of steps (a) and after none of steps (b) a calcination is carried out.

Treatment According to (a)

According to (a), the zeolitic material is treated with an aqueous solution having a pH of at most 5. Preferably, the aqueous solution used in (a) has a pH in the range of from 0 to 5, more preferably from 0 to 4, more preferably from 0 to 3, more preferably from 0 to 2.

The pH of the aqueous solution used in (a) is adjusted by a suitable amount of at least one acid which is dissolved in water. Generally, it is conceivable that in addition to the at least one acid, the aqueous solution contains at least one base, provided that the aqueous solution has a pH as defined above. Preferably, the aqueous solution used in (a) consists of water and at least one acid dissolved in the water.

According to the present invention, the aqueous solution used in (a) comprises at least one organic acid or at least one inorganic acid or a mixture of at least one organic and at least one inorganic acid. In principle, any conceivable acid may be comprised in the aqueous solution used in (a). Preferably, the organic acid is selected from the group consisting of oxalic acid, acetic acid, citric acid, methane sulfonic acid, and a mixture of two or more thereof. Preferably, the inorganic acid is selected from the group consisting of phosphoric acid, sulphuric acid, hydrochloric acid, nitric acid, and a mixture of two or more thereof. Preferably, at least one inorganic acid is used. Preferably, the inorganic acid is nitric acid.

In general, there is no particular restriction as to the concentration of the organic and the inorganic acid comprised in the aqueous solution used in (a), provided the pH of the aqueous solution used in (a) is as defined above.

Preferably, the zeolitic material is treated in (a) with the aqueous solution at a temperature in the range of from 20° C. to 100° C., more preferably from 25° C. to 95° C., more preferably from 30° C. to 90° C., more preferably from 35° C. to 85° C., more preferably from 40° C. to 80° C., more preferably from 45° C. to 75° C., more preferably from 50° C. to 70° C., more preferably from 55° C. to 65° C. During (a), the zeolitic material can be treated at two or more different temperatures.

Preferably, the zeolitic material is treated in (a) with the aqueous solution for a period in the range of from 10 min to 12 h, more preferably from 0.5 h to 6 h, more preferably from 1 h to 2 h.

Generally, the treatment according to (a) can be carried out according to any suitable method. Preferably, the zeolitic material is suspended in the aqueous solution. During (a), it is further preferred to stir the aqueous solution containing the zeolitic material. The stirring rate can be kept essentially constant or changed during (a). Most preferably, the zeolitic material is suspended in the aqueous solution at a first stirring rate, which stirring rate is changed, preferably increased, after having completely suspended the zeolitic material. The stirring rates can be suitably chosen depending, for example, on the volume of the aqueous solution, the amount of the zeolitic material employed, the desired temperature, and the like. Preferably, the stirring rate under which the treatment at the above-described temperatures is carried out is preferably in the range of from 5 r.p.m. to 300 r.p.m. (rounds per minute) depending on the size of the vessel.

Preferably, the weight ratio of the aqueous solution relative to the zeolitic material during the treatment according to (a) is in the range of from 2:1 to 10:1, more preferably from 2:1 to 5:1, more preferably the weight ratio of the aqueous solution relative to the zeolitic material during the treatment according to (a) is 3:1.

After treating of the zeolitic material with an aqueous solution according to (a), the zeolitic material is preferably suitably separated from the suspension. All methods of separating the zeolitic material from the suspension are conceivable. These methods include, for example, filtration, ultrafiltration, diafiltration and centrifugation methods. In particular in case the step (a) is the last step of the process of the present invention, separating the zeolitic material by spray-drying processes or spray-granulation is conceivable. A combination of two or more of these methods can be applied. According to the present invention, the zeolitic material is preferably separated from the suspension by a filtration method. As discussed above, after a step (a), the preferably separated zeolitic material can be subjected to a washing step at a temperature below 75° C. and/or drying and/or calcination. Washing agents include, but are not limited to, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred. Water as sole washing agent is especially preferred. It is preferred to continue the washing process until the washing agent, preferably the washing water, has a conductivity of at most 400 microSiemens/cm, preferably at most 300 microSiemens/cm, more preferable at most 200 microSiemens/cm.

Treatment According to (b)

After the first treatment of the zeolitic material with an aqueous solution according to (a), the zeolitic material, optionally washed and/or dried and/or calcined, is subjected to a treatment according to (b) wherein the zeolitic material is treated with a liquid aqueous system having a pH in the range of 5.5 to 8 and a temperature of at least 75° C.

The reaction conditions used in (b) are not specifically restricted provided that the aqueous system is at least partially, preferably completely in its liquid state. In particular, concerning the preferred temperatures described below, the skilled person will choose the respective pressure under which the treatment is carried out in order to keep the solvent system in its liquid state.

Preferably, the zeolitic material is treated in (b) with the liquid aqueous system at a temperature in the range of from 80° C. to 180° C., more preferably from 80° C. to 150° C., more preferably from 80° C. to 120° C., more preferably from 80° C. to 100° C., more preferably from 85° C. to 95° C.

Preferably, the zeolitic material is treated in (b) with the liquid aqueous system for a period in the range of from 0.5 h to 24 h, preferably from 1 h to 18 h, more preferably from 6 h to 10 h.

Generally, the treatment according to (b) can be carried out according to any suitable method. Preferably, the zeolitic material is suspended in the liquid aqueous system. During (b), it is further preferred to stir the liquid aqueous system containing the zeolitic material. The stirring rate can be kept essentially constant or changed during (b). Most preferably, the zeolitic material is suspended in the liquid aqueous system at a first stirring rate, which stirring rate is changed, preferably increased, after having completely suspended the zeolitic material. The stirring rates can be suitably chosen depending, for example, on the volume of the liquid aqueous system, the amount of the zeolitic material employed, the desired temperature, and the like. Preferably, the stirring rate under which the treatment at the above-described temperatures is carried out is preferably in the range of from 5 r.p.m. to 300 r.p.m. (rounds per minute) depending on the size of the vessel.

Preferably, the weight ratio of the liquid aqueous system relative to the zeolitic material during the treatment according to (b) is in the range of from 20:1 to 2:1, more preferably from 15:1 to 3:1, more preferably from 14:1 to 4:1, more preferably from 13:1 to 6:1, more preferably from 12:1 to 8:1.

Preferably, more than 50 weight-% of the liquid aqueous system used in (b) consist of water. In addition to water, the liquid aqueous system may comprise at least one suitable component such as alcohols, preferably short-chain alcohols having 1, 2, 3, 4 or 5 carbon atoms, preferably 1, 2 or 3 carbon atoms such as methanol, ethanol, propanol, and/or an acid, and/or a base, and/or a mixture of two or more thereof, with the proviso that the pH of the liquid aqueous system is in above-defined range. Preferably, at least 90 weight-%, more preferably at least 95 weight-%, more preferably at least 98 weight-%, more preferably at least 99 weight-%, more preferably at least 99.9 weight-% of the liquid aqueous system used in (b) consist of water.

It has been found that by the process according to treatment (ii) of the present invention, a zeolitic material with an increased molar ratio of $YO_2 : X_2O_3$ could be obtained. Moreover, it has been found that the obtained zeolitic material has either a maintained or slightly decreased hydrophobicity as determined by the water uptake. Surprisingly, said obtained zeolitic material has an increased crystallinity as determined by XRD measurements, when compared to zeolitic materials obtained only by the conventional leaching processes for removal of X from the zeolite framework structure, for example, by acidic treatment as defined in (a) however without an additional treatment as defined in (b) of the inventive process. More surprisingly, it has been found that said a zeolitic material obtained in this fashion contains a reduced concentration of internal defects, as evidenced by IR spectrum of the zeolitic material, wherein a first absorption band has its maximum in the range of from 3730 to 3750 $cm^{-1}$, wherein said first absorption band may be attributed to silanol nests, and a second absorption band has its maximum in the range of from 3600 to 3700 $cm^{-1}$, wherein said second absorption band may be attributed to surface silanol groups, and the ratio of the peak height of the second absorption band relative to the peak height of the first absorption band is decreased significantly below 1 after the process according to treatment (ii). Again, within the meaning of the present invention, the term "surface silanol" or "surface silanol groups" preferably refers to Si-OH groups which are not hydrogen-bonded and of which the characteristic absorption in the IR spectra of e.g. silicalites is found in the range of 3650 to 3800 $cm^{-1}$, as described in Zecchina et al. in *J. Phys. Chem.* 1992, 96, pp. 4991-4997. More specifically, the intensity ratio of the first absorption band to the second absorption band obtained from the evaluation of a given IR spectrum of a zeolitic material constitutes a reliable indicator as to the relative concentration of silanol nests in a given zeolitic material, and in particular as to changes in the silanol nest concentration upon treatment of the zeolitic material, e.g. as a result of acid treatment thereof. More specifically, a decrease in the intensity ratio of the first absorption band to the second absorption is indicative of a decrease in the relative concentration of the silanol nests in the zeolitic material whereas an increase thereof accordingly reflects a increase in the relative concentration of the silanol nests.

After treating of the zeolitic material with an aqueous solution according to (b), the zeolitic material is preferably suitably separated from the suspension. All methods of separating the zeolitic material from the suspension are conceivable. These methods include, for example, filtration, ultrafiltration, diafiltration and centrifugation methods. In particular in case the step (b) is the last step of the process of the present invention, separating the zeolitic material by spray-drying processes or spray-granulation is conceivable. A combination of two or more of these methods can be applied. According to the present invention, the zeolitic material is preferably separated from the suspension by a filtration method. As discussed above, after a step (b), the preferably separated zeolitic material can be subjected to washing step at a temperature below 75° C. and/or drying and/or calcination. Washing agents include, but are not limited to, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred.

Water as sole washing agent is especially preferred. It is preferred to continue the washing process until the washing agent, preferably the washing water, has a conductivity of at most 400 microSiemens/cm, preferably at most 300 microSiemens/cm, more preferable at most 200 microSiemens/cm.

Ion Exchange

According to an embodiment of the present invention, the zeolitic material is optionally subjected to one or more ion-exchange procedures in (ii). Generally, any conceivable ion-exchange procedure can be carried out. Preferably, the ion to be exchanged is comprised in at least one aqueous solution according to (a) and/or in at least one liquid aqueous system according to (b), preferably in at least one aqueous solution according to (a). In this case, the aqueous solution or the liquid aqueous system, preferably the aqueous solution, comprises at least one salt of at least one organic and/or at least one inorganic acid. Preferably, the cation of this salt which is the ion to be exchanged is selected from the group consisting of $H^+$, $NH_4^+$, lithium, potassium, calcium, magnesium, barium, transition metals, and combinations thereof, more preferably from the group consisting of $H^+$, $NH_4^+$, lithium, potassium, calcium, magnesium, barium, lanthanum, cerium, nickel, platinum, palladium, iron, copper and combinations thereof, wherein even more preferably the one or more cation elements comprise $H^+$ and/or $NH_4^+$, preferably $NH_4^+$. In this case, it is even more preferred that the zeolitic material provided in (i) is provided in its sodium form.

Thus, according to a particular preferred embodiment of the present invention, the aqueous solution according to (a) and/or the liquid aqueous system according to (b), preferably the aqueous solution according to (a), comprises at least one salt of at least one organic acid and/or at least one salt of at least one inorganic acid, preferably at least one salt of at least one inorganic acid, wherein the at least one salt is preferably an ammonium salt.

Step (i)

Generally, there are no specific restrictions how the zeolitic material provided in step (i) is provided, with the proviso that the framework structure comprises $YO_2$ and $X_2O_3$, wherein Y is a tetravalent element and X is a trivalent element. Preferably, the zeolitic material is either purchased from a commercial source or prepared according to a suitable synthetic process. Among the synthetic processes, hydrothermal processes can be mentioned by way of example wherein said processes can be carried out in the presence or in the absence of a structure directing agent such as an organotemplate and/or in the presence or in the absence of seed crystals. Preferably, the zeolitic material provided in (i) is in the form of a zeolitic powder or in the form of a spray powder or a spray granulate, preferably in the form of a zeolitic powder.

Preferably, and in particular for a zeolitic material having framework structure BEA, the zeolitic material provided in (i) is provided by an organotemplate-free synthesis method comprising (1) preparing a mixture comprising seed crystals and at least one source for $YO_2$ and at least one source for $X_2O_3$, and (2) crystallizing the zeolitic material from the mixture prepared in (1), wherein the seed crystals used in (1) comprise zeolitic material having the framework structure of the zeolitic material to be provided in (i).

According to said preferred synthesis for providing the zeolitic material in step (i), at no point does the mixture provided in (1) and crystallized in (2) contain more than an impurity of an organic structure directing agent specifically used in the synthesis of zeolitic material, in particular specific tetraacylammonium salts and/or related organotemplates such as tetraethylammonium and/or dibenzylmethylammonium salts, and dibenzyl-1,4-diazabicyclo[2,2,2]octane. Such an impurity can, for example, be caused by organic structure directing agents still present in seed crystals used in the preferred synthesis. Organotemplates contained in seed crystal material may not, however, participate in the crystallization process since they are trapped within the seed crystal framework and therefore may not act structure directing agents within the meaning of the present invention.

According to the present invention, the zeolitic material obtained from (1) is crystallized in (2). For this purpose, $YO_2$ can be provided in (1) in any conceivable form, provided that a zeolitic material having a framework structure comprising $YO_2$ can be crystallized in (2). Preferably, $YO_2$ is provided as such and/or as a compound which comprises $YO_2$ as a chemical moiety and/or as a compound which (partly or entirely) is chemically transformed to $YO_2$ during the inventive process. In preferred embodiments of the present invention, wherein Y stands for Si or for a combination of Si with one or more further tetravalent elements, the source for $SiO_2$ provided in step (1) can be any conceivable source. There can therefore be used, for example, all types of silica and silicates, preferably fumed silica, silica hydrosols, reactive amorphous solid silica, silica gel, silicic acid, water glass, sodium metasilicate hydrate, sesquisilicate or disilicate, colloidal silica, pyrogenic silica, silicic acid esters, or tetraalkoxysilanes, or mixtures of at least two of these compounds.

According to preferred embodiments of the preferred synthetic method, wherein the mixture according to (1) comprises one or more sources for $SiO_2$, said source preferably comprises one or more compounds selected from the group consisting of silica and silicates, preferably alkali metal silicates. Among the preferred alkali metal silicates, the one or more sources preferably comprise water glass, more preferably sodium and/or potassium silicate, and more preferably sodium silicate. In particularly preferred embodiments of the present invention, the source for $SiO_2$ is sodium silicate. Furthermore, in further preferred embodiments comprising silica, sodium waterglass is particularly preferred.

According to preferred embodiments of the present invention, wherein the zeolitic material comprise $X_2O_3$, one or more sources for $X_2O_3$ are provided in step (1) of the preferred synthetic method. In general, $X_2O_3$ can be provided in any conceivable form, provided that a zeolitic material having a framework structure comprising $X_2O_3$ can be crystallized in step (2). Preferably, $X_2O_3$ is provided as such and/or as a compound which comprises $X_2O_3$ as a chemical moiety and/or as a compound which, partly or entirely, is chemically transformed to $X_2O_3$ during the inventive process.

According to preferred embodiments of the preferred synthetic method, wherein X is Al or a combination of Al with one or more further trivalent elements, the source for $Al_2O_3$ provided in (1) can be any conceivable source. There can be used for example any type of alumina and aluminates, aluminum salts such as, for example, alkali metal aluminates, aluminum alcoholates, such as, for example, aluminum triisopropylate, or hydrated alumina such as, for example, alumina trihydrate, or mixtures thereof. Preferably, the source for $Al_2O_3$ comprises one or more compounds selected from the group consisting of alumina and aluminates, preferably aluminates, more preferably alkali metal aluminates. Among the preferred alkali metal aluminates, the one or more sources preferably comprise sodium and/or potassium aluminate, more preferably sodium aluminate. In particularly preferred embodiments of the preferred synthetic method, the source for $Al_2O_3$ is sodium aluminate.

According to further preferred embodiments of the preferred synthetic method, seed crystals are provided in (1), wherein said seed crystals comprise a zeolitic material having the framework structure of the zeolitic material to be provided in (i). In general, said seed crystals can comprise any zeolitic material, provided that a zeolitic material is crystallized in (2). Preferably, the zeolitic material comprised in the seed crystals is a zeolitic material which is obtainable and preferably obtained according to the preferred embodiments of the present invention. More preferably, the zeolitic material comprised in the seed crystals is the same as the zeolitic material which is then crystallized in (2).

According to the present invention, any suitable amount of seed crystals can be provided in the mixture according to (1), provided that a zeolitic material is crystallized in (2). In general, the amount of seed crystals contained in the mixture according to (1) ranges from 0.1 to 50 wt.-% based on 100 wt.-% of $YO_2$ in the one or more sources for $YO_2$, preferably from 0.5 to 35 wt.-%, more preferably from 1 to 20 wt.-%, more preferably from 1.5 to 10 wt.-%, more preferably from 2 to 5 wt.-%, and even more preferably from 2.5 to 3.5 wt.-%.

In (1) according to the preferred synthetic method, the mixture can be prepared by any conceivable means, wherein mixing by agitation is preferred, preferably by means of stirring.

In preferred embodiments of the present invention, the mixture according to (1) further comprises a solvent. Any conceivable solvent can be used in any conceivable amount, provided that the zeolitic material can be crystallized in (2) of the preferred synthetic method. Preferably, the solvent comprises water, wherein the $H_2O:YO_2$ molar ratio of the mixture is in the range of from 1:1 to 100:1, preferably from 5:1 to 70:1, more preferably from 10:1 to 50:1, more preferably from 12:1 to 35:1, more preferably from 15:1 to 25:1, more preferably from 16:1 to 20:1, and particularly preferably from 17:1 to 18:1. In particularly preferred embodiments, the solvent provided in (1) is distilled water.

In general, the single components for providing the mixture of (1) of the present invention can be added in any order, provided that the zeolitic material is crystallized from the mixture in (2) of the present invention. This may, for example, involve the addition of the optional solvent and the one or more sources for $X_2O_3$ followed by the addition of the one or more sources for $YO_2$, wherein the seed crystals are only added to the mixture afterwards. Alternatively, the addition of the optional solvent and the one or more sources for $X_2O_3$ may be first followed by the addition of the seed crystals, wherein the one or more sources for $YO_2$ is only added thereafter.

In general, (2) according to the preferred embodiment of the present invention can be conducted in any conceivable manner, provided that the zeolitic material is crystallized from the mixture according to step (1). The mixture can be crystallized in any type of vessel, wherein a means of agitation is optionally employed, said agitation being preferably achieved by rotation of the vessel and/or stirring, and more preferably by stirring the mixture.

According to the preferred synthetic method, the mixture is preferably heated during at least a portion of the crystallization process in (2). In general, the mixture can be heated to any conceivable temperature of crystallization, provided that the zeolitic material is crystallized from the mixture. Preferably, the mixture is heated to a temperature of crystallization ranging from 80 to 200° C., more preferably from 90 to 180° C., more preferably from 95 to 170° C., more preferably from 100 to 160° C., more preferably from 110 to 150° C., and even more preferably from 115 to 145° C.

The preferred heating in (2) of the preferred embodiment of the present invention can be conducted in any conceivable manner suitable for the crystallization of a zeolitic material. In general, heating may be conducted at one temperature of crystallization or vary between different temperatures. Preferably, a heat ramp is used for reaching the temperature of crystallization, wherein, by way of example, the heating rate may range from 10° C./h to 150° C./h, more preferably from 15° C./h to 70° C./h, more preferably from 20° C./h to 50° C./h, more preferably from 25° C./h to 40° C./h, and even more preferably from 30° C./h to 35° C./h.

In preferred embodiments of the inventive process wherein a solvent is present in the mixture according to step (1), it is furthermore preferred that heating in step (2) is conducted under solvothermal conditions, meaning that the mixture is crystallized under autogenous pressure of the solvent which is used, for example by conducting heating in an autoclave or other crystallization vessel suited for generating solvothermal conditions. In particularly preferred embodiments wherein the solvent comprises or consists of water, preferably of distilled water, heating in step (2) is accordingly preferably conducted under hydrothermal conditions.

The apparatus which can be used in the present invention for crystallization is not particularly restricted, provided that the desired parameters for the crystallization process can be realized, in particular with respect to the preferred embodiments requiring particular crystallization conditions. In the preferred embodiments conducted under solvothermal conditions, any type of autoclave or digestion vessel can be used.

Isolation of the crystallized product can be achieved by any conceivable means. Preferably, isolation of the crystallized product can be achieved by means of filtration, ultrafiltration, diafiltration, centrifugation and/or decantation methods, wherein filtration methods can involve suction and/or pressure filtration steps. Subsequently, the obtained zeolitic material is subjected to at least one washing procedure at a temperature of less than 75° C., preferably in the range of from 20 to 35° C.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

Preferably, the separated zeolitic material is washed until the washing agent, preferably the washing water, has a conductivity of at most 400 microSiemens/cm, preferably at most 300 microSiemens/cm, more preferable at most 200 microSiemens/cm.

In general, the process of the present invention can optionally comprise further steps for the work-up and/or further physical and/or chemical transformation of the zeolitic material provided in (i). The provided zeolitic material can for example be subject to any sequence of isolation and/or washing procedures, wherein the zeolitic material provided in (i) is preferably subject to at least one isolation and at least one washing procedure.

According to a preferred embodiment of the present invention, the separated and washed zeolitic material is optionally subjected to one or more drying steps. In general, any conceivable means of drying can be used. Drying procedures preferably include heating and/or applying vacuum to the zeolitic material. In envisaged embodiments of the present invention, one or more drying steps may involve spray drying, preferably spray granulation of the zeolitic material. Optionally, the spray dried zeolitic material obtained from (i) is subjected to calcination, prior to subjecting the zeolitic material to a treatment according to (ii).

According to an especially preferred embodiment of the present invention, the zeolitic material is not subjected to a water steam treatment, preferably not subjected to a steam treatment, neither in (i) nor in (ii) nor after (ii).

Preferred Zeolitic Materials

The framework structure of the zeolitic material provided in (i) is not particularly restricted.

Generally, the zeolitic materials may have a framework structure type according to the following three-letter codes: ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EPI, ERI, ESV, ETR, EUO, FAU, FER, FRA, GIS, GIU, GME, GON, GOO, HEU, IFR, ISV, ITE, ITH, ITW, IWR, IWW, JBW, KFI, LAU, LEV, LIO, LOS, LOV, LTA, LTL, LTN, MAR, MAZ, MEI, MEL, MEP, MER, MMFI, MFS, MON, MOR, MSO, MTF, MTN, MTT, MTW, MWW, NAB, NAT, NEES, NON, NPO, OBW, OFF, OSI, OSO, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN SFO, SGT, SOD, SSY, STF, STI, STT, TER, THO, TON, TSC, UEI, UFI, UOZ, USI, UTL, VET, VFI, VNI, VSV, WEI, WEN, YUG and ZON. Regarding the three-letter codes and their definitions, reference is made to the "Atlas of Zeolite Framework Types", $5^{th}$ edition, Elsevier, London, England (2001)."

According to a preferred embodiment of the present invention, the zeolitic material provided in (i) has a LEV, CHA, MFI, MWW, BEA framework structure, the framework structure preferably being BEA, the zeolitic material more preferably being zeolite Beta.

Preferably, according to the present invention, the method according to (ii) is a procedure for removing at least a portion of X from the framework structure of the zeolitic material. Depending on the composition of the zeolitic material provided according to (i), the $YO_2$: $X_2O_3$ molar ratio is increased by the process of the present invention by at least 20%, preferably by at least 25% such as at least 25%, at least 30%, at least 35%, at least 40%, at least 45%, at least 50%. Surprisingly, it was found that although the $YO_2$:$X_2O_3$ molar ratio is increased, the inventive sequence of steps (a) and (b) allows to obtain a zeolitic material which exhibits no loss in crystallinity. Quite to the contrary, it was found that it is even possible to increase the $YO_2$:$X_2O_3$ molar ratio and, simultaneously, increase the crystallinity.

In particular for zeolitic materials provided in (i) having a crystallinity in the range of from 50% to 100% such as from 60% to 90% or from 70% to 80%, it was found that it is possible to increase the $YO_2$:$X_2O_3$ molar ratio and, simultaneously, increase the crystallinity wherein said increased crystallinity is in the range of from 70% to 105%, preferably from 75% to 100%.

Thus, the present invention relates to a zeolitic material, having a framework structure which comprises $YO_2$ and $X_2O_3$, wherein Y is a tetravalent element and X is a trivalent element, wherein after one treatment according to (a) followed by a treatment according to (b) the zeolitic material preferably has a post-synthesis-increased $YO_2$:$X_2O_3$ molar ratio of at least 12:1, wherein more preferably the increased molar ratio lies in the range of from 12:1 to 60:1. If at least one further treatment according to (a) is performed, the zeolitic material preferably has a preferably post-synthesis-increased $YO_2$:$X_2O_3$ molar ratio of at least 20:1, and more preferably an increase molar ratio which lies in the range of from 20:1 to 60:1. Preferably, after one treatment according to (a) followed by a treatment according to (b) the zeolitic material has a $YO_2$:$X_2O_3$ molar ratio in the range of from 12:1 to 60:1. If at least one further treatment according to (a) is applied, the zeolitic material preferably has a $YO_2$:$X_2O_3$ molar ratio in the range of from 20:1 to 60:1, and more preferably from 20:1 to 40:1.

Therefore, the present invention also relates to a zeolitic material, having a framework structure which comprises $YO_2$ and $X_2O_3$, wherein Y is a tetravalent element and X is a trivalent element, the zeolitic material preferably having a post-synthesis-increased $YO_2$:$X_2O_3$ molar ratio of at least 12:1 and a crystallinity of at least 70%. More preferably, the $YO_2$:$X_2O_3$ molar ratio is in the range of from 12:1 to 60:1, preferably from 20:1 to 60:1, more preferably from 20:1 to 40:1, and the crystallinity is in the range of from 70% to 105%, preferably from 75% to 100%.

Further, it was surprisingly found that the process of the present invention allows to keep the hydrophobicity of the zeolitic material as provided in (i) essentially constant or even increase it. The term "hydrophobicity" as used in this context of the present application is characterized by the water uptake of the zeolitic material. Generally, the lower the water uptake, the higher is the hydrophobicity of the zeolitic material.

Therefore, the present invention also relates to the zeolitic material as defined above, wherein the water uptake of the zeolitic material is at most 20 weight-%, and preferably lies in the range of from 5 weight-% to 20 weight-%, more preferably in the range of from 10 weight-% to 20 weight-%, more preferably in the range of from 12 weight-% to 20 weight-%, and more preferably in the range of from 12 weight-% to 18 weight-%.

Further, it was found that the process of the present invention has a positive influence on the silanol group characteristics of the zeolitic material. In particular, in the infrared spectrum of the zeolitic material of the present invention, a first type of silanol groups is represented by a first absorption band with a maximum in the region of 3730 cm$^{-1}$ to 3750 cm$^{-1}$, wherein said first absorption band may be attributed to silanol nests, and a second type of silanol groups is represented by a second absorption band with a maximum in the region of 3600 cm$^{-1}$ to 3700 cm$^{-1}$, wherein said second absorption band may be attributed to surface silanol groups. As noted above, concerning the intensity ratio of the first IR absorption band to the second IR absorption band, decrease of said ratio indicates a decrease in the relative concentration of internal defects (i.e., silanol nests) in the zeolitic material, which is induced by the treatment with a liquid aqueous system in step (ii)(b) of the inventive process. More specifically, it may be observed that the treatment of a zeolitic material for increasing the YO$_2$:X$_2$O$_3$ molar ratio by acid treatment leads to the increased formation of silanol nests characterized by an increase in intensity of the first absorption band, whereas the concentration of surface silanol groups reflected by the intensity of the second absorption band remains comparably constant upon treatment for the increasing the increasing the YO$_2$:X$_2$O$_3$ molar ratio. As a result, the intensity ratio of the first absorption band to the second absorption band obtained from the evaluation of a given IR spectrum of a zeolitic material constitutes a reliable indicator as to the concentration of silanol nests in a given zeolitic material, and in particular as to changes in the silanol nest concentration upon acid treatment of the zeolitic material. Thus, as noted above, a decrease in the intensity ratio of the first absorption band to the second absorption is indicative of an decrease in silanol nest concentration in the zeolitic material whereas an increase thereof accordingly reflects a increase in silanol nest concentration.

Consequently, the surprising technical effect of the inventive process may be observed by observing the evolution of the intensity ratio of the aforementioned bands in the IR spectrum of the zeolitic material prior to and after the treatment of step (ii)(b), wherein the decrease in said ratio which may be observed in said step indicates the surprising regenerative effects provided by the inventive process after degradation of the zeolitic structure as a result of the treatment in step (ii)(a) for removing X$_2$O$_3$ from the zeolite framework by acid treatment.

It was found that the ratio of the peak height of the second peak representing the silanol groups of the second type relative to the peak height of the first peak representing the silanol groups of the first type is preferably at most 1, more preferably smaller than 1 such as at most 0.9, at most 0.8, at most 0.7, at most 0.6, or at most 0.5. Preferably, this ratio is in the range of from 0.1 to 1, preferably from 0.1 to less than 1 such as from 0.1 to 0.9 or from 0.2 to 0.8 or from 0.3 to 0.7.

As defined above, no specific restrictions exist as far as the chemical nature of Y and X is concerned. In particular, Y can be any conceivable tetravalent element or mixture of two or more tetravalent elements, and X can be any conceivable trivalent element or mixture of two or more trivalent elements. Preferred tetravalent elements according to the present invention include, but are not restricted to, Si, Sn, Ti, Zr, and Ge. Preferred trivalent elements according to the present invention include, but are not restricted to, Al, B, In, Ga and Fe. Preferably, Y is selected from the group consisting of Si, Sn, Ti, Zr, Ge and combinations of two or more thereof, Y preferably being Si, and X is selected from the group consisting of Al, B, In, Ga, Fe and combinations of two or more thereof, X preferably being Al.

Therefore, the present invention also relates to the zeolitic material as defined above, wherein Y is selected from the group consisting of Si, Sn, Ti, Zr, Ge, and combinations of two or more thereof, Y preferably being Si, and wherein X is selected from the group consisting of Al, B, In, Ga, Fe and combinations of two or more thereof, X preferably being Al, wherein preferably at least 95 weight-%, more preferably at least 98 weight-%, more preferably at least 99 weight-% of the framework structure of the zeolitic material consist of YO$_2$ and X$_2$O$_3$, preferably SiO$_2$ and Al$_2$O$_3$.

Preferably, the zeolitic material has a LEV, CHA, MFI, MWW, BEA framework structure, the framework structure preferably being BEA, the zeolitic material more preferably being zeolite Beta. Concerning these zeolitic framework structures and their definition, reference is made to the three letter codes described in the "Atlas of Zeolite Framework Types", 5$^{th}$ edition, Elsevier, London, England (2001). In particular, the present invention relates to above-defined zeolitic material, wherein Y is Si and X is Al, the zeolitic material being dealuminated zeolite Beta.

The present invention further relates to a zeolitic material which is obtainable or obtained by the process according to the present invention.

Preferred Uses

The zeolitic material according to the present invention and/or the zeolitic material obtainable or obtained by the process according to the invention generally can be used for every conceivable purpose such as a catalytically active agent, a catalyst support, a molecular sieve, an adsorbent, a filler, and the like.

Generally, and in particular in case the inventive zeolitic material is used as catalyst, it is possible to prepare a molding comprising the zeolitic material, for example by suitably mixing the zeolitic material with at least one binder and/or with at least one binder precursor, and optionally at least one pore-forming agent and/or at least one plasticizing agent. The moldings may be shaped in every conceivable geometry such as strands, for example having rectangular, triangular hexagonal, quadratic, oval, or circular crosssection, stars, tablets, spheres, hollow cylinders, and the like. Examples of such binders are metal oxides, such as, for example, SiO$_2$, Al$_2$O$_3$, TiO$_2$, ZrO$_2$ or MgO or clays or mixtures of two or more of these oxides or mixed oxides of at least two of Si, Al, Ti, Zr, and Mg. Pore-forming agent such as mesopore-forming agents include polymeric vinyl compounds, such as polyalkylene oxides like polyethylene oxides, polystyrene, polyacrylates, polymethacrylates, polyolefins, polyamides and polyesters. Pasting agents include organic, in particular hydrophilic polymers, such as carbohydrates like cellulose, cellulose derivatives, such as methyl cellulose, and starch, such as potato starch, wallpaper plaster, polyacrylates, polymethacrylates, polyvinyl alcohol, polyvinylpyrrolidone, polyisobutene or polytetrahydrofuran. The use of water, alcohols or glycols or mixtures thereof, such as mixtures of water and alcohol, or water and glycol, such as for example water and methanol, or water and ethanol, or water and propanol, or water and propylenglycol, as pasting agents may be mentioned.

According to a preferred embodiment, the zeolitic material according to the present invention and/or the zeolitic material obtainable or obtained by the process of the present invention are used as a catalyst in a catalytic process.

The present invention is illustrated by the following Examples and Comparative Examples.

EXAMPLES

Reference Example 1

Determination of the Water Uptake

Water adsorption/desorption isotherms were performed on a VTI SA instrument from TA Instruments following a step-isotherm program. The experiment consisted of a run or a series of runs performed on a sample material that has been placed on the microbalance pan inside of the instrument. Before the measurement was started, the residual moisture of the sample was removed by heating the sample to 100° C. (heating ramp of 5° C./min) and holding it for 6 h under a nitrogen flow. After the drying program, the temperature in the cell was decreased to 25° C. and kept isothermal during the measurement. The microbalance was calibrated, and the weight of the dried sample was balanced (maximum mass deviation 0.01 wt.-%). Water uptake by the sample was measured as the increase in weight over that of the dry sample. First, as adsorption curve was measured by increasing the relative humidity (RH) (expressed as wt.-% water in the atmosphere inside of the cell) to which the sample was exposed and measuring the water uptake by the sample as equilibrium. The RH was increased with a step of 10 wt.-% from 5% to 85% and at each step the system controlled the RH and monitored the sample weight until reaching the equilibrium conditions after the sample was exposed from 85 wt.-% to 5 wt.% with a step of 10% and the change in the weight of the sample (water uptake) was monitored and recorded.

Reference Example 2

Determination of the Crystallinity

The crystallinity of the zeolitic materials according to the present invention was determined by XRD analysis, wherein the crystallinity of a given material is expressed relative to a reference zeolitic material wherein the reflecting surfaces of the two zeolitic materials are compared. The reference zeolitic material was zeolite ammonium beta powder commercially available from Zeolyst International, Valley Forge, Pa. 19482, USA, under the tradename CP814C, CAS Registry Number 1318-02-1, wherein this powder was further calcined under air for 5 h at 500° C. (heating ramp 1° C./min). The determination of the crystallinities were performed on a D8 Advance series 2 diffractometer from Bruker AXS. The diffractometer was configured with an opening of the divergence aperture of 0.1° and a Lynxeye detector. The samples as well as the reference zeolitic material were measured in the range from 19° to 25° (2 Theta). After baseline correction, the reflecting surfaces were determined by making use of the evaluation software EVA (from Bruker AXS). The ratios of the reflecting surfaces are given as percentage values.

Reference Example 3

IR Measurements

The IR measurements were performed on a Nicolet 6700 spectrometer. The zeolitic materials were pressed into a self-supporting pellet without the use of any additives. The pellet was introduced into a high vacuum cell placed into the IR instrument. Prior to the measurement the sample was pretreated in high vacuum ($10^{-5}$ mbar) for 3 h at 300° C. The spectra were collected after cooling the cell to 50° C. The spectra were recorded in the range of 4000 $cm^{-1}$ to 800 $cm^{-1}$ at a resolution of 2 $cm^{-1}$. The obtained spectra were represented by a plot having on the x axis the wavenumber ($cm^{-1}$) and on the y axis the absorbance (arbitrary units). For the quantitative determination of the peak heights and the ratio of the peak heights, a baseline correction was carried out. Changes in the 3000 $cm^{-1}$ to 3900 $cm^{-1}$ region were analyzed and for comparing multiple samples, the band at 1800±5 $cm^{-1}$ was taken as reference.

Reference Example 4

Preparation of the Starting Materials (Zeolitic Materials)

a) 1000 g zeolitic material prepared according to b) were added to 10 g of a 10 weight-% solution of ammonium nitrate. The suspension was heated to 80° C. and kept at this temperature under continuous stirring for 2 h. The solid was filtered hot (without additional cooling) over a filter press. The filter cake was then washed with distilled water (room temperature wash water) until the conductivity of the wash water was below 200 microSiemens/cm. The filter cake was dried for 16 h at 120° C. This procedure was repeated once, affording ion exchanged crystalline product BEA in its ammonium form. A following calcination step at 500° C. for 5 h (heat ramp 1° C./min) afforded ion exchanged crystalline product BEA in its H-form.

b) 335.1 g of $NaAlO_2$ were dissolved in 7314 g of $H_2O$ while stirring, followed by addition of 74.5 g of zeolite Beta seeds (commercially available from Zeolyst International, Valley Forge, Pa. 19482, USA, under the tradename CP814C, CAS Registry Number 1318-02-1). The mixture was placed in a 20 L autoclave and 7340 g sodium waterglass and 1436 g Ludox AS40 were added. Crystallization of the obtained aluminosilicate gel took place at 120° C. for 117 h. After having let the reaction mixture cool to room temperature, the solid was separated by filtration, repeatedly washed with distilled water and then dried at 120° C. for 16 h. The resulting material had a water uptake of 12 weight-%.

Comparative Example 1

Dealumination of a Zeolitic Material Without Treatment with a Liquid Aqueous System First Acidic Dealumination 300 g of a 4 weight-% $HNO_3$ aqueous solution, having a pH in the range of from 0 to 1, were provided in a vessel, and 100 g zeolitic material having a BEA framework structure, a $SiO_2:Al_2O_3$ molar ratio of 10.79: 1 and a crystallinity of 78% as prepared according to Reference Example 4 a) were added. The suspension was stirred at 200 rpm (rounds per minute) for 2 h at a temperature of 60° C. The suspension was filtered and the filter cake was then washed with de-ionized water at room temperature until the washing water had a conductivity of less than 200 microSiemens/cm. The obtained zeolitic material was dried at 120° C. for 16 h and calcined by heating to 600° C. (heat ramp 1° C. per minute) and subsequent heating at 600° C. for 5 h. The obtained zeolitic material had a $SiO_2$:$Al_2O_3$ molar ratio of 14.80: 1, a crystallinity of 72% and a water uptake of 13.9 weight-%. Moreover, the IR spectrum of the obtained product exhibits a first absorption band with the maximum in the range of from 3730 to 3750 $cm^{-1}$ (absorbance intensity of 0.37 at 3741 $cm^{-1}$) and a second absorption band with the maximum in the range of from 3600 to 3700 $cm^{-1}$ (absorbance intensity of 0.37 at 3659 $cm^{-1}$), wherein the ratio of the peak height of the second absorption band relative to the peak height of the first absorption band is 1.01. This zeolitic material was subjected to a second acidic dealumination.

Second Acidic Dealumination 273 g of a 4 weight-% $HNO_3$ aqueous solution, having a pH in the range from 0 to 1, were provided in a vessel and 91 g zeolitic material obtained from the first acidic dealumination were added. The suspension was stirred at 200 rpm (rounds per minute) for 2 h at a temperature of 60° C. The suspension was filtered and the filter cake was then washed with de-ionized water at room temperature until the washing water had a conductivity of less than 200 microSiemens/cm. The obtained zeolitic material was dried at 120° C. for 16 h and calcined by heating to 600° C. (heat ramp 1° C. per minute) and subsequent heating at 600° C. for 5 h. The obtained zeolitic material had a $SiO_2$:$Al_2O_3$ molar ratio of 21.08:1, a crystallinity of 72% and a water uptake of 15.9 weight-%. Moreover, the IR spectrum of the obtained product exhibits a first absorption band with the maximum in the range of from 3730 to 3750 $cm^{-1}$ (absorbance intensity of 0.37 at 3741 $cm^{-1}$) and a second absorption band with the maximum in the range of from 3600 to 3700 $cm^{-1}$ (absorbance intensity of 0.20 at 3663 $cm^{-1}$), wherein the ratio of the peak height of the second absorption band relative to the peak height of the first absorption band is 0.521. This zeolitic material was subjected to a third acidic dealumination treatment.

Third Acidic Dealumination 237 g of a 4 weight-% $HNO_3$ aqueous solution, having a pH in the range from 0 to 1, were provided in a vessel and 79 g zeolitic material obtained from the second acidic dealumination were added. The suspension was stirred at 200 rpm (rounds per minute) for 2 h at a temperature of 60° C. The suspension was filtered and the filter cake was then washed with de-ionized water at room temperature until the washing water had a conductivity of less than 200 microSiemens/cm. The obtained zeolitic material was dried at 120° C. for 16 h and calcined by heating to 600° C. (heat ramp 1° C. per minute) and subsequent heating at 600° C. for 5 h. The obtained zeolitic material had a $SiO_2$:$Al_2O_3$ molar ratio of 40.00:1, a crystallinity of 50%, and a water uptake of 14.3 weight-%. Moreover, the IR spectrum of the obtained product exhibits a first absorption band with the maximum in the range of from 3730 to 3750 $cm^{-1}$ (absorbance intensity of 0.95 at 3741 $cm^{-1}$) and a second absorption band with the maximum in the range of from 3600 to 3700 $cm^{-1}$ (absorbance intensity of 0.54 at 3626 $cm^{-1}$), wherein the ratio of the peak height of the second absorption band relative to the peak height of the first absorption band is 0.565.

Result of the Comparative Experiment

By the acidic treatments as described above, the $SiO_2$:$Al_2O_3$ molar ratio of the zeolitic material was increased from 10.79:1 to 40:1. However, the crystallinity of the zeolitic material significantly deteriorated from an initial value of 78% to a final value of 50%.

Therefore, the acidic dealumination process resulted in a loss of crystallinity of 36%. In particular, the crystallinity of the zeolitic material starts to deteriorate significantly (i.e., from 72% to 50%) after the third acidic dealumination. Besides that, after first decreasing after the first second acidic dealumination, the ratio of the peak height of the second IR absorption band relative to the peak height of the first IR absorption band starts to increase, indicating an increase in the relative concentration of the internal defects (i.e., silanol nests).

Example 1

Dealumination with Treatment with a Liquid Aqueous System

First Acidic Dealumination 300 g of a 4 weight-% $HNO_3$ aqueous solution, having a pH in the range from 0 to 1, were provided in a vessel and 100 g zeolitic material having a BEA framework structure, a $SiO_2$:$Al_2O_3$ molar ratio of 10.79: 1 and a crystallinity of 78% as prepared according to Reference Example 4 a) were added (the same zeolitic material was employed as in Comparative Example 1).

The suspension was stirred at 200 rpm (rounds per minute) for 2 h at a temperature of 60° C. The suspension was filtered and the filter cake was then washed with de-ionized water at room temperature until the washing water had a conductivity of less than 200 microSiemens/cm. The obtained zeolitic material was dried by heating at 120° C. for 16 h and calcined by heating to 600° C. (heat ramp 1° C. per minute) and subsequent heating at 600° C. for 5 h. The obtained zeolitic material had a $SiO_2$:$Al_2O_3$ molar ratio of 14.58:1, a crystallinity of 73% and a water uptake of 14.4 weight-%. Moreover, the IR spectrum of the obtained product exhibits a first absorption band with the maximum in the range of from 3730 to 3750 $cm^{-1}$ (absorbance intensity of 0.37 at 3741 $cm^{-1}$) and a second absorption band with the maximum in the range of from 3600 to 3700 $cm^{-1}$ (absorbance intensity of 0.37 at 3659 $cm^{-1}$), wherein the ratio of the peak height of the second absorption band relative to the peak height of the first absorption band is 1.01. This zeolitic material was subjected to a first treatment with a liquid aqueous system.

First Treatment with a Liquid Aqueous System 750 g de-ionized water and 85 g zeolitic material obtained from the first acidic dealumination were provided in a vessel. The suspension was heated to 90° C. and stirred for 9 h. From this suspension, the zeolitic material was separated by filtration. The obtained zeolitic material was dried at 120° C. for 16 h. The obtained zeolitic material had a $SiO_2$:$Al_2O_3$ molar ratio of 14.80:1, a crystallinity of 75% and a water uptake of 12 weight-%. Moreover, the IR spectrum of the obtained product exhibits a first absorption band with the maximum in the range of from 3730 to 3750 $cm^{-1}$ (absorbance intensity of 0.36 at 3732 $cm^{-1}$) and a second absorption band with the maximum in the range of from 3600 to 3700 $cm^{-1}$ (absorbance intensity of 0.26 at 3617 $cm^{-1}$), wherein the ratio of the peak height of the second absorption band relative to the peak height of the first absorption band is 0.730. This zeolitic material was subjected to a second acidic dealumination.

Second Acidic Dealumination 240 g of a 4 weight-% $HNO_3$ aqueous solution, having a pH in the range from 0 to 1, were provided in a vessel and 80 g zeolitic material obtained from the first treatment with a liquid aqueous system were added. The suspension was stirred at 200 rpm (rounds per minute) for 2 h at a temperature of 60° C. The suspension was filtered and the filter cake was then washed with de-ionized water at room temperature until the washing water had a conductivity of less than 200 microSiemens/cm. The obtained zeolitic material was dried at 120° C. for 16 h and calcined by heating to 600° C. (heat ramp 1° C. per minute) and subsequent heating at 600° C. for 5 h. The obtained zeolitic material had a $SiO_2:Al_2O_3$ molar ratio of 21.62: 1, a crystallinity of 73% and a water uptake of 15.7 weight-%. Moreover, the IR spectrum of the obtained product exhibits a first absorption band with the maximum in the range of from 3730 to 3750 $cm^{-1}$ (absorbance intensity of 0.29 at 3736 $cm^{-1}$) and a second absorption band with the maximum in the range of from 3600 to 3700 $cm^{-1}$ (absorbance intensity of 0.18 at 3668 $cm^{-1}$), wherein the ratio of the peak height of the second absorption band relative to the peak height of the first absorption band is 0.621. This zeolitic material was subjected to a second treatment with liquid aqueous system.

Second Treatment with a Liquid Aqueous System 750 g de-ionized water and 67 g zeolitic material obtained from the second acidic dealumination were provided in a vessel. The suspension was heated to 90° C. and stirred for 9 h. From this suspension zeolitic material was separated by filtration. The obtained zeolitic material was dried at 120° C. for 16 h. The obtained zeolitic material had a $SiO_2: 1_2O_3$ molar ratio of 21.39: 1, a crystallinity of 78% and a water uptake of 14.8 weight-%. Moreover, the IR spectrum of the obtained product exhibits a first absorption band with the maximum in the range of from 3730 to 3750 $cm^{-1}$ (absorbance intensity of 0.74 at 3734 $cm^{-1}$) and a second absorption band with the maximum in the range of from 3600 to 3700 $cm^{-1}$ (absorbance intensity of 0.31 at 3663 $cm^{-1}$), wherein the ratio of the peak height of the second absorption band relative to the peak height of the first absorption band is 0.418. This zeolitic material was subjected to a third acidic dealumination.

Third Acidic Dealumination 195 g of a 4 weight-% $HNO_3$ aqueous solution, having a pH in the range from 0 to 1, were provided in a vessel and 65 g zeolitic material obtained from the second treatment with a liquid aqueous system were added. The suspension was stirred at 200 rpm (rounds per minute) for 2 h at a temperature of 60° C. The suspension was filtered and the filter cake was then washed with de-ionized water at room temperature until the washing water had a conductivity of less than 200 microSiemens/cm. The obtained zeolitic material was dried at 120° C. for 16 h and calcined by heating to 600° C. (heat ramp 1° C. per minute) and subsequent heating at 600° C. for 5 h. The obtained zeolitic material had a $SiO_2:Al_2O_3$ molar ratio of 36.52: 1, a crystallinity of 98% and a water uptake of 17.3 weight-%. Moreover, the IR spectrum of the obtained product exhibits a first absorption band with the maximum in the range of from 3730 to 3750 $cm^{-1}$ (absorbance intensity of 0.37 at 3743 $cm^{-1}$) and a second absorption band with the maximum in the range of from 3600 to 3700 $cm^{-1}$ (absorbance intensity of 0.14 at 3658 $cm^{-1}$), wherein the ratio of the peak height of the second absorption band relative to the peak height of the first absorption band is 0.383.

Results of Example 1

As in the Comparative Example 1, three acidic dealumination steps were carried out in Example 1. As in the Comparative Example 1, the $SiO_2:Al_2O_3$ molar ratio was increased from the starting value of 10.79:1 to a value of 36.52:1 which is about the same as the value obtained in Comparative Example 1 (40:1). However, contrary to the process according to Comparative Example 1, the crystallinity of the zeolitic material did not decrease. Quite to the contrary, the intermediate treatments with a liquid aqueous system according to the invention even resulted in an increase in crystallinity from the starting value of 78% to the final value of 98%.

Moreover, although two treatments with a liquid aqueous systems were performed, the water uptake of the zeolitic material which characterizes the hydrophobicity of the zeolitic material and, thus, an important chemical parameter of the zeolitic material, did not change significantly (12 weight-% of the starting material, 14.4 weight-% for the material after the first acidic treatment, 17.3 weight-% of the product).

Furthermore, concerning the ratio of the peak height of the second IR absorption band relative to the peak height of the first IR absorption band, said ratio decreases continuously during the above process for the preparation of Example 1, indicating that the relative concentration of internal defects (i.e., silanol nests) is decreased continuously by the inventive process comprising steps (ii)(a) and (ii)(b) as defined in claim 1. Such an increase of crystallinity and a decrease of internal defects during the leaching of Al out of the zeolitic material are entirely unexpected, especially in view of Comparative Example 1 wherein a conventional dealumination process leads to a deterioration the crystal quality, in particular with respect to the crystallinity as well as with respect to the concentration of internal defects, in particular when obtaining products with higher $YO_2 : X_2O_3$ molar ratios.

Example 2

Dealumination with Treatment with a Liquid Aqueous System Without Calcination

First Acidic Dealumination 300 g of a 4 weight-% $HNO_3$ aqueous solution, having a pH in the range from 0 to 1, were provided in a vessel and 100 g zeolitic material having a BEA framework structure, a $SiO_2:Al_2O_3$ molar ratio of 10.79: 1 and a crystallinity of 78% as prepared according to Reference Example 4 a) were added (the same zeolitic material was employed as in Comparative Example 1 and in Example 1).

The suspension was stirred at 200 rpm (rounds per minute) for 2 h at a temperature of 60° C. The suspension was filtered and the filter cake was then washed with de-ionized water at room temperature until the washing water had a conductivity of less than 200 microSiemens/cm. The obtained zeolitic material was dried under vacuum. The obtained zeolitic material had a $SiO_2:Al_2O_3$ molar ratio of 13.49:1 and a water uptake of 14.6 weight-%. This zeolitic material was subjected to a first treatment with a liquid aqueous system.

First Treatment with a Liquid Aqueous System 750 g de-ionized water and the dried zeolitic material obtained from the first acidic dealumination were provided in a vessel. The suspension was heated to 90° C. and stirred for 9 h. From this suspension zeolitic material was separated by filtration. The obtained zeolitic material had a water uptake of 12.5 weight-%. This zeolitic material was subjected to a second acidic dealumination.

Second Acidic Dealumination 192 g of a 4 weight-% $HNO_3$ aqueous solution, having a pH in the range from 0 to 1, were provided in a vessel and 64 g zeolitic material obtained from the first treatment with a liquid aqueous system were added. The suspension was stirred at 200 rpm (rounds per minute) for 2 h at a temperature of 60° C. The suspension was filtered and the filter cake was then washed with de-ionized water at room temperature until the washing water had a conductivity of less than 200 microSiemens/cm. The obtained zeolitic material was dried at 120° C. for 16 h. The obtained zeolitic material had a $SiO_2$: $Al_2O_3$ molar ratio of 19.72:1 and a water uptake of 18.9 weight-%. This zeolitic material was subjected to a second treatment with a liquid aqueous system.

Second Treatment with a Liquid Aqueous System 750 g de-ionized water and 54 g zeolitic material obtained from the second acidic dealumination were provided in a vessel. The suspension was heated to 90° C. and stirred for 9 h. From this suspension zeolitic material was separated by filtration. The obtained zeolitic material had a $SiO_2$:$Al_2O_3$ molar ratio of 20.08:1, a crystallinity of 79% and a water uptake of 12.5 weight-%

Results of Example 2

As Example 1, also Example 2 shows that the inventive treatment with a liquid aqueous system as step in a dealumination process, allows the $SiO_2$:$Al_2O_3$ molar ratio to be increased (from 10.79:1 to 20.08:1) and, simultaneously, to increase the crystallinity of the zeolitic material (from 78% to 79%).

Moreover, although two treatments with a liquid aqueous systems were performed, the water uptake of the zeolitic material which characterizes the hydrophobicity of the zeolitic material and, thus, an important chemical parameter of the zeolitic material, did not change significantly (12 weight-% of the starting material, 14.6 weight-% for the material after the first acidic treatment, 12.5 weight-% of the product).

Example 3

Large Scale Experiment with Increasing Acid Strength

First Acidic Dealumination 51.45 kg of a 4 weight-% $HNO_3$ aqueous solution, having a pH in the range from 0 to 1, were provided in a vessel, equipped with a disk-type stirrer, and 17.15 kg zeolitic material having a BEA framework structure, a $SiO_2$:$Al_2O_3$ molar ratio of 10.79:1 and a crystallinity of 78% as prepared according to Reference Example 4 a) were added. The suspension was stirred for 2 h at a temperature of 60° C. The suspension was cooled to 50° C., filtered and the filter cake was then washed with de-ionized water at room temperature until the washing water had a conductivity of less than 200 microSiemens/cm. The obtained zeolitic material was dried at 120° C. for 16 h and calcined by heating to 600° C. (1° C. per minute) and subsequent heating at 600° C. for 5 h. The obtained zeolitic material had a $SiO_2$:$Al_2O_3$ molar ratio of 14.49:1. This zeolitic material was subjected to a first treatment with a liquid aqueous system.

First Treatment with a Liquid Aqueous System 127 kg de-ionized water and 15.89 kg zeolitic material obtained from the first acidic dealumination were provided in a vessel, equipped with a propeller stirrer. The suspension was heated to 90° C. and stirred for 9 h. From this suspension zeolitic material was separated by filtration. The obtained zeolitic material was dried at 120° C. for 68 h. This zeolitic material was subjected to a second acidic dealumination.

Second Acidic Dealumination 46.61 kg of a 4 weight-% $HNO_3$ aqueous solution, having a pH in the range from 0 to 1, were provided in a vessel, equipped with a disk-type stirrer, and 15.54 kg zeolitic material obtained from the first treatment with a liquid aqueous system were added. The suspension was stirred for 2 h at a temperature of 60° C. The suspension was cooled to 50° C., filtered and the filter cake was then washed with de-ionized water at room temperature until the washing water had a conductivity of less than 200 microSiemens/cm. The obtained zeolitic material was dried at 120° C. for 48 h and calcined by heating to 600° C. (1° C. per minute) and subsequent heating at 600° C. for 5 h. The obtained zeolitic material had a $SiO_2$:$Al_2O_3$ molar ratio of 19.73:1. This zeolitic material was subjected to a second treatment with a liquid aqueous system.

Second Treatment with a Liquid Aqueous System 116 kg de-ionized water and 14.48 kg g zeolitic material obtained from the second acidic dealumination were provided in a vessel, equipped with a propeller stirrer. The suspension was heated to 90° C. and stirred for 9 h. From this suspension zeolitic material was separated by filtration. The obtained zeolitic material was dried at 120° C. for 22 h. This zeolitic material was subjected to a third acidic dealumination.

Third Acidic Dealumination 40.95 kg of a 4 weight-% $HNO_3$ aqueous solution, having a pH in the range from 0 to 1, were provided in a vessel, equipped with a disk-type stirrer, and 13.65 kg zeolitic material obtained from the second treatment with a liquid aqueous system were added. The suspension was stirred for 2 h at a temperature of 60° C. The suspension was cooled to 50° C., filtered and the filter cake was then washed with de-ionized water at room temperature until the washing water had a conductivity of less than 200 microSiemens/cm. The obtained zeolitic material was dried at 120° C. for 68 h and calcined by heating to 600° C. (1° C. per minute) and then heating at 600° C. for 5 h. The obtained zeolitic material had a $SiO_2$:$Al_2O_3$ molar ratio of 31.53:1. This zeolitic material was subjected to a third treatment with a liquid aqueous system.

Third Treatment with a Liquid Aqueous System 103 kg de-ionized water and 12.82 kg g zeolitic material obtained from the third acidic dealumination were provided in a vessel, equipped with a propeller stirrer. The suspension was heated to 90° C. and stirred for 9 h. From this suspension zeolitic material was separated by filtration. The obtained zeolitic material was dried at 120° C. for 22 h. This zeolitic material was subjected to a fourth acidic dealumination.

Fourth Acidic Dealumination 38.16 kg of a 8 weight-% $HNO_3$ aqueous solution, having a pH in the range from 0 to 1, were provided in a vessel, equipped with a disk-type stirrer, and 12.72 kg zeolitic material obtained from the third treatment with a liquid aqueous system were added. The suspension was stirred for 2 h at a temperature of 60° C. The suspension was cooled to 50° C., filtered and the filter cake was then washed with de-ionized water at room temperature until the washing water had a conductivity of less than 200 microSiemens/cm. The obtained zeolitic material was dried at 120° C. for 25 h and calcined by heating to 600° C. (1° C. per minute) and then heating at 600° C. for 5 h. The obtained zeolitic material had a SiO$_2$:Al$_2$O$_3$ molar ratio of 46.67: 1 and a crystallinity of 82%.

Results of Example 3

As Examples 1 and 2, also Example 3, carried out as a large-scale experiment and, thus, under different conditions, shows that the inventive treatment with a liquid aqueous system as step in a dealumination process, allows the SiO$_2$:Al$_2$O$_3$ molar ratio to be increased (from 10.79:1 to 46.67:1) and, simultaneously, to increase the crystallinity of the zeolitic material (from 78% to 82%). It must be emphasized that the crystallinity was increased by the inventive process, although the SiO$_2$:Al$_2$O$_3$ molar ratio was increased for a factor of about 5 and, thus, increased for a factor larger than the respective factor according to the Comparative Example 1 (about 4) where a significant decrease of the crystallinity was observed.

Example 4

Dealumination with Treatment with a Liquid Aqueous System, Including Treatment with Salt of an Inorganic Acid First Acidic Dealumination 200 g NH$_4$NO$_3$ were dissolved in 600 g of a 4 weight-% HNO$_3$ aqueous solution, having a pH in the range from 0 to 1, and 200 g zeolitic material having a BEA framework structure, a SiO$_2$:Al$_2$O$_3$ molar ratio of 9.68:1, a Na$^+$ content of 5.1% and a crystallinity of 72% as prepared according to Reference Example 4 b) were added. The suspension was stirred for 2 h at a temperature of 60° C. The suspension was filtered and the filter cake was then washed with de-ionized water at room temperature until the washing water had a conductivity of less than 200 microSiemens/cm. The obtained zeolitic material was dried at 120° C. for 16 h and calcined by heating to 600° C. (1° C. per minute) and subsequent heating at 600° C. for 5 h. The obtained zeolitic material had a SiO$_2$:Al$_2$O$_3$ molar ratio of 13.21:1 and a Na$^+$ content of 0.36%. This zeolitic material was subjected to a first treatment with a liquid aqueous system.

First Treatment with a Liquid Aqueous System 1500 g de-ionized water and 160 g zeolitic material from the second acid dealumination were provided in a vessel. The suspension was heated to 90° C. and stirred for 9 h. From this suspension the zeolitic material was separated by filtration and dried at 120° C. for 12 h. This zeolitic material was subjected to a second acidic dealumination.

Second Acidic Dealumination 160 g NH$_4$NO$_3$ were dissolved in 480 g of a 4 weight-% HNO$_3$ aqueous solution, having a pH in the range from 0 to 1, and 160 g zeolitic material obtained from the second treatment with a liquid aqueous system were added. The suspension was stirred for 2 h at a temperature of 60° C. The suspension was filtered and the filter cake was then washed with de-ionized water at room temperature until the washing water had a conductivity of less than 200 microSiemens/cm. The obtained zeolitic material was dried at 120° C. for 16 h and calcined by heating to 600° C. (1° C. per minute) and subsequent heating at 600° C. for 5 h. The obtained zeolitic material had a SiO$_2$:Al$_2$O$_3$ molar ratio of 20.81:1 and a Na$^+$ content of 0.01%. This zeolitic material was subjected to a second treatment with a liquid aqueous system.

Second Treatment with a Liquid Aqueous System 1500 g de-ionized water and 140 g zeolitic material obtained from the second acid dealumination were provided in a vessel. The suspension was heated to 90° C. and stirred for 9 h. From this suspension the zeolitic material was separated by filtration and dried at 120° C. for 12 h. This zeolitic material was subjected to a third acidic dealumination.

Third Acidic Dealumination 420 g of a 4 weight-% HNO$_3$ aqueous solution, having a pH in the range from 0 to 1, were provided in a vessel and 140 g zeolitic material obtained from the second treatment with a liquid aqueous system were added. The suspension was stirred for 2 h at a temperature of 60° C. The suspension was filtered and the filter cake was then washed with de-ionized water at room temperature until the washing water had a conductivity of less than 200 microSiemens/cm. The obtained zeolitic material was dried at 120° C. for 16 h and calcined by heating to 600° C. (1° C. per minute) and subsequent heating at 600° C. for 5 h. The obtained zeolitic material had a SiO$_2$:Al$_2$O$_3$ molar ratio of 30.77:1, a Na$^+$ content of 0.01% and a crystallinity of 75%.

Results of Example 4

As Examples 1, 2 and 3, also Example 4 shows that the inventive treatment with a liquid aqueous system as step in a dealumination process, allows the SiO$_2$:Al$_2$O$_3$ molar ratio to be increased (from 9.68:1 to 30.77: 1) and, simultaneously, to increase the crystallinity of the zeolitic material (from 72% to 75%).

Moreover, Example 4 shows that the inventive treatment allows a simultaneous ion exchange. The treatment with a aqueous solution comprising NH$_4$NO$_3$ according to Example 4 leads to a significant decrease of the Na$^+$ content in the zeolitic material (from 5.1% to 0.01%) by exchange of the Na$^+$ ions with NH$_4^+$ ions.

SUMMARY OF THE EXAMPLES

As shown in the Comparative Example and the Examples according to the invention, the process of the present invention is highly advantageous for processes wherein the YO$_2$:X$_2$O$_3$ molar ratio, in particular the SiO$_2$:Al$_2$O$_3$ molar ratio of a zeolitic material is to be increased since the crystallinity of the zeolitic material, a significant feature of the zeolitic material, can be increased. No matter if the experiments were carried out in laboratory scale or industrial scale, and irrespective of the factor by which the YO$_2$:X$_2$O$_3$ molar ratio, in particular the SiO$_2$:Al$_2$O$_3$ molar ratio is increased: the inventive treatment with a liquid aqueous system allows the crystallinity of the zeolitic material thus treated to be kept constant or even increased.

CITED LITERATURE

EP 0 013 433 A1
WO 02/057181 A2
WO 2009/016153 A2

The invention claimed is:

1. A process for a post-treatment of a zeolitic material, the process comprising:
(i) providing the zeolitic material, wherein the zeolitic material has a framework structure comprising YO$_2$ and X$_2$O$_3$, wherein Y is a tetravalent element and X is a trivalent element, and wherein Y is selected from the group consisting of Si, Sn, Ti, Zr, Ge, and any combination thereof, and wherein X is selected from the group consisting of Al, B, In, Ga, Fe and any combination thereof;

(ii) subjecting the zeolitic material to a method comprising
  (a) treating the zeolitic material with an acidic aqueous solution having a pH of at most 5, wherein the aqueous solution comprises at least one of an organic acid and an inorganic acid; and
  (b) treating the zeolitic material obtained from (a) with a liquid aqueous system having a pH of ranging from 5.5 to 8 and at a temperature of at least 75° C., wherein the liquid aqueous system comprises at least 90 weight-% water,
wherein neither in (i) nor in (ii), the zeolitic material is subjected to water stream treatment
wherein the pH of the aqueous solution according to (a) and the pH of the liquid aqueous system according to (b) is determined using a pH sensitive glass electrode.

2. The process of claim 1, wherein the method according to (ii) comprises:
  (a) treating the zeolitic material with the acidic aqueous solution having a pH of at most 5;
  (b) treating the zeolitic material obtained from (a) with a liquid aqueous system having a pH ranging from 5.5 to 8 and at a temperature of at least 75° C.; and
  (c) treating the zeolitic material obtained from (b) with the acidic aqueous solution having a pH of at most 5.

3. The process of claim 2, wherein after (a), the zeolitic material is subjected to a treatment with a liquid aqueous system having a pH ranging from 5.5 to 8 and at a temperature of less than 75° C.

4. The process of claim 1, wherein in (a), the acidic aqueous solution comprises one or more of an organic acid selected from the group consisting of oxalic acid, acetic acid, citric acid, methane sulfonic acid, and any mixture thereof, and of an inorganic acid selected from the group consisting of phosphoric acid, sulphuric acid, hydrochloric acid, nitric acid, and any mixture thereof.

5. The process of claim 1, wherein in (a), the acidic aqueous solution has a pH ranging from 0 to 5.

6. The process of claim 1, wherein in (a), the zeolitic material is treated with the acidic aqueous solution at a temperature ranging from 20° C. to 100° C.

7. The process of claim 1, wherein in (a), the zeolitic material is treated with the acidic aqueous solution for a period ranging from 10 min to 12 h.

8. The process of claim 1, wherein in (b), the zeolitic material is treated with the liquid aqueous system at a temperature ranging from 80° C. to 180° C.

9. The process of claim 1, wherein in (b), the zeolitic material is treated with the liquid aqueous system for a period ranging from 0.5 h to 24 h.

10. The process of claim 1, wherein in (b), a weight ratio of the liquid aqueous system relative to the zeolitic material ranges from 20:1 to 2:1.

11. The process of claim 1, wherein in (b), the liquid aqueous system comprises at least 99 weight-% water.

12. The process of claim 1, wherein in (ii) and after (b), the zeolitic material is subjected to one or more of drying and calcination.

13. The process of claim 1, wherein Y is Si, and wherein X is Al.

14. The process of claim 1, wherein one or more of the acidic aqueous solution according to (a) and of the liquid aqueous system according to (b) comprise one or more of at least one salt of at least one organic acid and of at least one salt of at least one inorganic acid.

15. The process of claim 14, wherein the at least one salt is an ammonium salt and the zeolitic material provided in (i) is in a sodium form.

16. The process of claim 1, wherein (i) comprises an organotemplate-free synthetic method comprising
  (1) preparing a mixture comprising seed crystals and at least one source for $YO_2$ and at least one source for $X_2O_3$, and
  (2) crystallizing the zeolitic material from the mixture, wherein the seed crystals comprise zeolitic material having the framework structure of the zeolitic material.

17. The process of claim 1, wherein the zeolitic material in (i) has a LEV, CHA, MFI, MWW, BEA framework structure.

18. The process of claim 1, wherein neither in (i) nor in (ii) nor after (ii), the zeolitic material is subjected to water steam treatment.

19. A zeolitic material, having a framework structure which comprises $YO_2$ and $X_2O_3$, wherein Y is a tetravalent element and X is a trivalent element, wherein Y is selected from the group consisting of Si, Sn, Ti, Zr, Ge and any combination thereof, wherein X is selected from the group consisting of Al, B, In, Ga, Fe and any combination thereof, wherein the zeolitic material is characterized by a IR spectrum exhibiting a first absorption band with a maximum in a range of from 3730 $cm^{-1}$ to 3750 $cm^{-1}$ and a second absorption band with a maximum in a range of from 3600 $cm^{-1}$ to 3700 $cm^{-1}$, wherein a ratio of a peak height of the second absorption band relative to a peak height of the first absorption band is in a range of from 0.1 to 0.9.

20. The zeolitic material of claim 19, wherein a $YO_2$ : $X_2O_3$ molar ratio is in a range of from 20:1 to 60:1.

21. The zeolitic material of claim 19, wherein a water uptake of the zeolitic material is at most 20 weight-%.

22. The zeolitic material of claim 19, wherein the ratio of the peak height of the second absorption band relative to the peak height of the first absorption band is in a range of from 0.2 to 0.8.

23. The zeolitic material of claim 19, wherein Y is Si, and wherein X is Al.

24. The zeolitic material of claim 19, having a LEV, CHA, MFI, MWW, BEA framework structure.

25. The zeolitic material of claim 19, wherein Y is Si and X is Al, and the zeolitic material is dealuminated zeolite Beta.

26. A zeolitic material obtained by the process of claim 1.

* * * * *